United States Patent
Mackay et al.

(10) Patent No.: US 7,401,085 B2
(45) Date of Patent: Jul. 15, 2008

(54) SYSTEM AND METHOD FOR CONTROLLING THE RELEASE OF UPDATES TO A DATABASE CONFIGURATION

(75) Inventors: Bryan Mackay, Seaford, NY (US); Paul Wolpe, New York, NY (US)

(73) Assignee: BlackRock, Inc., New York, NY (US)

( * ) Notice: Subject to any disclaimer, the term of this patent is extended or adjusted under 35 U.S.C. 154(b) by 516 days.

(21) Appl. No.: 10/824,042

(22) Filed: Apr. 14, 2004

(65) Prior Publication Data

US 2005/0234934 A1    Oct. 20, 2005

(51) Int. Cl.
G06F 17/30    (2006.01)

(52) U.S. Cl. .............................. 707/100; 707/1; 707/10

(58) Field of Classification Search .................... 707/1, 707/10, 100–104.1; 705/1
See application file for complete search history.

(56) References Cited

U.S. PATENT DOCUMENTS

| | | | |
|---|---|---|---|
| 6,363,388 B1 * | 3/2002 | Sprenger et al. | 707/10 |
| 2002/0169745 A1 * | 11/2002 | Hotti et al. | 707/1 |
| 2003/0204499 A1 * | 10/2003 | Shahabi et al. | 707/3 |
| 2003/0236874 A1 * | 12/2003 | Hotti | 709/224 |
| 2004/0024736 A1 * | 2/2004 | Sakamoto et al. | 707/1 |
| 2004/0024768 A1 * | 2/2004 | Haller | 707/100 |
| 2004/0088316 A1 * | 5/2004 | Cleraux et al. | 707/102 |
| 2004/0098383 A1 * | 5/2004 | Tabellion et al. | 707/3 |
| 2004/0098425 A1 * | 5/2004 | Wiss et al. | 707/204 |
| 2004/0225669 A1 * | 11/2004 | Isaacson et al. | 707/101 |

* cited by examiner

*Primary Examiner*—Camy Truong
*Assistant Examiner*—Dennis Myint
(74) *Attorney, Agent, or Firm*—Scott David Wofsy; George Nicholas Chaclas; Edwards Angell Palmer & Dodge LLP

(57) ABSTRACT

A program product to perform a method for updating database objects in database servers. The program product causes the computer system to the perform steps of receive user specified database schema files for release to a list of corresponding database servers where modifications are to occur, wherein each schema file includes proposed database object structures, and verify that the schema files contain valid DDL commands. The computer system verifies that the user has proper permissions to modify the database object structures, and compares existing database object structures to the proposed database object structures to determine if the existing database object structures need to be modified. If the exising database object structures need to be modified, then the computer system modifies the existing database object structures, creates release notes that include documentation related to modifications of the database object structures, and sends the release notes to predefined addresses.

28 Claims, 11 Drawing Sheets

```
/*! This table defines permissions for individual users or user groups defined
    in the TABLE:user_group table. If the permission is a portfolio permission
    it is further limited to a fund or portfolio group defined in the
    TABLE:port_group table. */

CREATE TABLE permission
( user_group char(25) ,   /*! User group or employee login. User group names must
                              exist in TABLE:user_group and employee logins must
                              exist in TABLE:employees or
                              TABLE:user_group_expand. */
  perm_type char(20) ,    /*! The type of the permission granted. Must be defined
                              in the TABLE:permission_types table. */
  perm_group char(225)    /*! For portfolio based permission this is the
                              portfolio
                              group that must be defined in port_group. For other
                              types of permissions this should be set to *. */
go
```

| public | o Grant Select | |

410 — Associated Indices

| Index Name | Index Description | Columns | Comments |
|---|---|---|---|
| idx_permissions_clust | unique, clustered | perm_type, user_group, perm_group | |

412 — Reference Constraint(s)

No defined keys for this object.

414 — Check Constraints(s)

Object does not have any declarative constraints.

416 — Defined Keys

There are no No keys defined on this table.

418 — Associated Trigger or permissions

FIG. 4B

Permissions Schema on Database:

*Perms Schema of permissions* — 512

```
GRANT Select ON permissions TO public
go
```

*Perms Schema Diff of permissions* — 514

```
GRANT Delete ON permissions TO tsgops
GRANT Insert ON permissions TO tsgops
GRANT Update ON permissions TO tsgops
GRANT Delete ON permissions TO webprod
GRANT Insert ON permissions TO webprod
GRANT Update ON permissions TO webprod
go
```

Index Schema on Database: — 516

```
CREATE UNIQUE CLUSTERED INDEX idx_permissions_clust ON permissions (perm_type,user_group,perm_group)
go
```

Index Schema Diff:

/* /u1/build/dev/hftcp/permissions.idx matches database schema. */ — 518

FIG. 5C

```
% dbrelease bfmdb/permissions.tbl
Verifying all files meet release criteria .

Beginning release to SYBDEV

Releasing bfmdb/permissions.tbl...
    database matches file; nothing needs to be changed Finished successful release to SYBDEV Beginning release to SYBPRD Releasing bfmdb/permissions.tbl...
    dbrelease will run the following mod commands:
    ALTER TABLE permissions
1:      MODIFY user_group char(25) NOT NULL
2:      MODIFY perm_type char(20) NOT NULL
3:      MODIFY perm_group char(255) NOT NULL
4:
5:      go Finished successful release to SYBPRD

SUCCESSFUL DESTINATIONS (2) : SYBDEV, SYBPRD

Sending release notes .... done
%
```

FIG. 6

```
Release notes for bfmdb/permissions.tbl
by bgmackay, Tue Sep  2 18:43:48 2003

SUCCESSFUL DESTINATIONS (2) : SYBDEV, SYBPRD

CHANGES    : Extend the width of some columns.

REASON     : Supports changes for the New Employee project.

The permissions app has been re-tested/approved by CSG against SYBDEV.

START DATE : now

TEAM       : dba, mhochber

REQUEST LOG ENTRIES ADDRESSED:

SENTINEL   : <Outlook://Public Folders/All Public Folders/BlackRock
Public Folders/Sentinel/Sentinel Requests/~BLKBRS-3238>

BUILD INFO :
    bfmdb/permissions.tbl: 2003/08/28 01:11:03 1.6 1675809671.
```

SYSTEM AND METHOD FOR CONTROLLING THE RELEASE OF UPDATES TO A DATABASE CONFIGURATION

BACKGROUND OF THE INVENTION

1. Field of the Invention

The subject disclosure relates to managing the structure of database objects in database servers, and more particularly, to an improved system and method for updating database objects across a plurality of database servers in a network.

2. Background of the Related Art

The use of computers for storing and accessing information has become ubiquitous in the modern workplace. Virtually every industry that uses computers stores some or all of the necessary information in databases for easy access. Typically, the data is organized into tables as relational databases. A database management system ("DBMS") controls user access to the data and manages version control and updating so that multiple users can access the data therein.

The data tables are frequently stored in accordance with Structured Query language ("SQL") specifications. SQL is the language of choice for most modern multi-user, relational databases, i.e., SQL provides the syntax and idioms ("language") needed to talk to ("query") relational databases in a standardized, cross-platform/product way ("structured"). SQL uses tables typically composed of rows (records) and each row is composed of columns (fields). SQL refers to data as a set of pointers and provides predefined procedures to allow use of any value in a table to relate other tables in a database. SQL databases are indexed by a "data dictionary". The structure of database objects is represented by a collection of database schema files. The schema files result from data modeling. The schema files contain the standard Data Definition Language ("DDL") commands that are run against a database server to create the database objects. To access data in the tables, SQL navigates the system and produces "views" based on search criteria defined in an SQL query. A view is essentially a dynamically generated result table that is assembled based upon the parameters defined in a query.

SQL commands fall into two categories, DDL and a data manipulation language ("DML"). The DDL is used to define the database with commands such as create, alter and drop. The DML is used to manage the database with commands such as insert, update and delete. SQL shells are common and typically come bundled with every database. The SQL shells are usually simple filters which allow logging onto the database, execute commands and receive output. The SQL shells range from simple to complex. SQL shells provide access to the database. Socket-based middleware performs a similar function to SQL shells, but over a network. Thus, with a socket-based system, a user can send commands to a database in Connecticut while working in New York City by using TCP/IP over the Internet to connect. Of course, whether a command shell or a socket based connection is used, there is a need to know the language of the database in order to send commands. Generally, a sequence of statements is required to perform anything but the simplest of operations.

SQL statements are used to perform tasks such as update data on a database, or retrieve data from a database. When a user submits a query to an SQL database using SQL, the database will consult the data dictionary and access the tables that the user has requested data from. A view is compiled based upon the criteria defined in the SQL query. Similarly, a view could be composed of the results of a query on several tables all at once (sometimes called a "join"). However, the standard SQL commands such as select, insert, update, delete, create, and drop can be used to accomplish most data management tasks. SQL alleviates the need to perform the details of data storage and retrieval and the internal workings of the database and how it stores data on the file system need not be known.

However, this ease of working with the data has presented a challenge. Medium to large size companies can have a significant number of information technology specialists. Each specialist may be assigned a single task, yet each and every action related to the databases must be tracked and publicized. In addition, companies generate sufficient amounts of data such that the organization of data becomes very complex. Efficiency requires an infallible level of reliability in the storage and access of the data.

To facilitate the management of databases, version control systems have been developed such as the concurrent versions system ("CVS"). CVS records the history of source files and allows retrieval of old versions for debugging purposes. CVS stores the old versions by keeping track of the differences between versions. Despite tools such as CVS, the modification and update of the databases can occur without proper permission. As databases are modified and updated, control of the database configuration is lost. In such circumstances, standards are not maintained in every data warehousing facility and uniformity throughout a system can be lost. Further, certain users who need to apprised of modifications are not notified and problems proliferate. Still further, the database objects may not match the schema files and thus, the query may not be successfully completed.

There is a need, therefore, for an improved method for managing a plurality of database servers that permits control of the release of updates by verifying permissions and maintaining standards. There is also a need to supply a test mode to verify performance prior to production deployment. In addition, there is also a need to produce documentation that corresponds to modifications in the databases in order to track the database configuration.

SUMMARY OF THE INVENTION

The present disclosure is directed to a program product for use in a computer system that executes program steps recorded in a computer-readable medium to perform a method for updating database objects in a plurality of database servers in a distributed computing network. The program product includes a recordable media and a program of computer-readable instructions executable by the computer system to perform steps. The steps include receiving user specified database schema files for release to a list of corresponding database servers where modifications are to occur, wherein each schema file includes proposed database object structures, verifying that the schema files contain valid DDL commands, verifying that the user has proper permissions to modify the database object structures, comparing existing database object structures to the proposed database object structures to determine if the existing database object structures need to be modified, if the exising database object structures need to be modified, then modifying the existing database object structures, creating release notes that include documentation related to modifications of the database object structures, and sending the release notes to at least one predefined address.

In another aspect of the aforementioned method, the step of parsing may also include verifying that files meet predefined standards.

In addition, the method may also include releasing the modifications to multiple locations, releasing multiple files simultaneously, and posting the release notes to preselected newsgroups. Further, the method may provide running in a test mode for trial runs prior to production deployment.

Still another embodiment includes releasing an update to the database servers for all clients with a plurality of command bundled as a single command or module.

In addition, an alternative method may include the steps of allowing control of what the users associated with clients can change. For example, the users are selectively allowed to change database objects.

It is an advantage of the present disclosure that the method is equally applicable to a boutique investment management firm as to a very large scale established investment management firm.

It is another advantage of the present disclosure that the system provides a centralized mechanism to manage the structure of database objects across all database servers in a corporation.

In an aspect of the aforementioned method, a source control system server recognizes differences between schema files and the current structure of database objects. The source control server generates and executes the appropriate commands to automatically modify the database objects to match the schema files.

In another aspect of the aforementioned method, the source control system server utilizes the database schema files that define the structure of the tables, indexes, views, and stored procedures.

And yet another embodiment of the present invention provides automated documentation that is accessible over a distributed computing network such as the Internet.

It should be appreciated that the present invention can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings wherein:

FIG. 3 is an exemplary database schema file for a table in accordance with the subject invention.

FIGS. 4A and 4B are an exemplary documentation page for the table of FIG. 3 in accordance with the subject invention, wherein matching lines A-A illustrate how to properly connect FIGS. 4A and 4B.

FIGS. 5A, 5B and 5C are an exemplary documentation page showing additional information for a table that is obtained from a selected database server in accordance with the subject invention, wherein matching lines A-A and B-B illustrate how to properly connect FIGS. 5A and 5B, and 5B and 5C, respectively.

FIG. 6 is a page showing the output of the release command of FIG. 5.

FIG. 7 is an example of release notes in accordance with the invention.

DETAILED DESCRIPTION OF PREFERRED EMBODIMENTS

Figure 1:
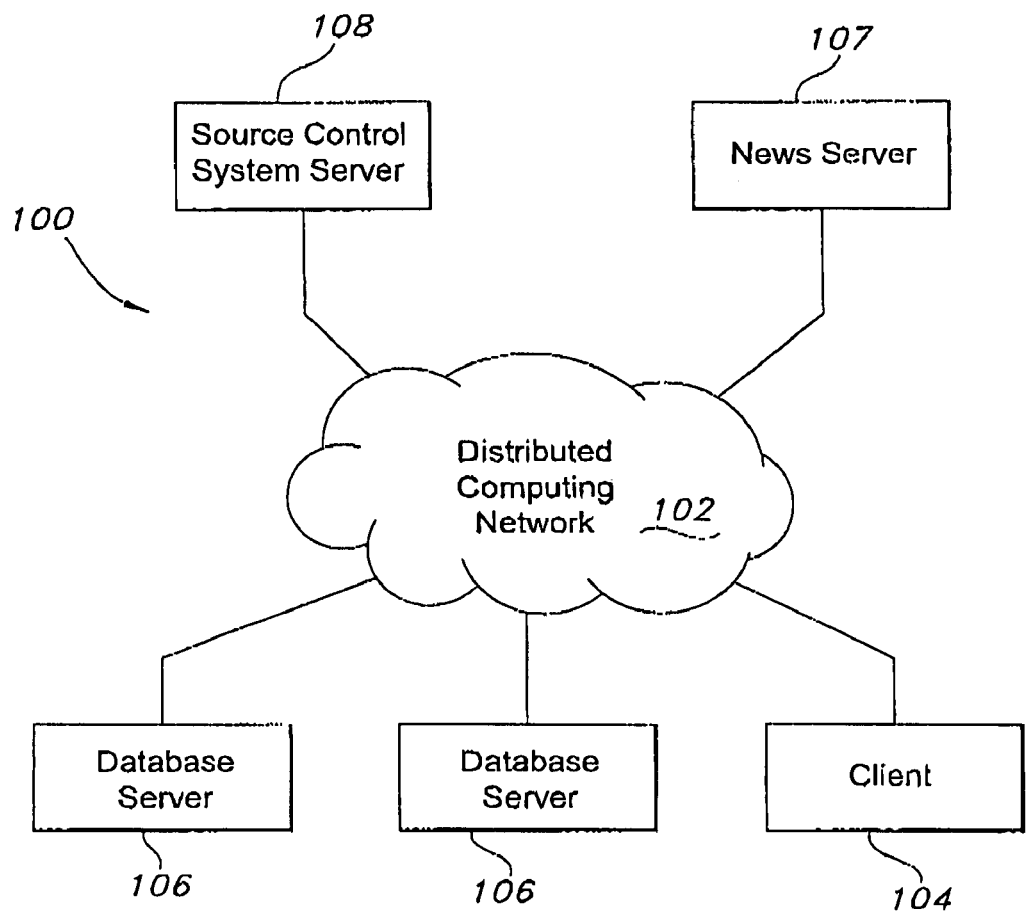
FIG. 1 is a schematic representation of the architecture of a distributed computing network environment for implementing the present method in accordance with the subject invention.

The present invention overcomes many of the prior art problems associated with managing the structure of database objects in a plurality of database servers in a distributed computing network. The advantages of the systems and methods disclosed herein will become more readily apparent to those having ordinary skill in the art from the following description of preferred embodiments taken in conjunction with the drawings which set forth representative embodiments of the present invention. When possible, like reference numerals identify similar structural elements.

Referring to FIG. 1, there is shown a schematic representation of an environment for a preferred embodiment of the subject invention which is referred to generally by the reference numeral 100. Many programs run within environment 100 to execute instructions that allow a plurality of database servers to be utilized for data storage. In a preferred embodiment, the databases store information to support providers of global investment management and risk management products. Without reliable storage and retrieval of massive amounts of data, such providers could not offer fixed income, liquidity, equity, alternative investment, and risk management products to their clients.

The environment 100 includes a plurality of clients 104 (only one shown) in communication by a distributed computing network 102. The environment is maintained by a single entity such as a corporation. The distributed computing network 102 may be comprised of a plurality of LAN, WAN and the like. The network 102 may also include public networks such as the Internet as would be appreciated by those of ordinary skill in the pertinent art. The clients 104 access information stored on one or more database servers 106. To access the information, the clients 104 interact with a source control system server 108.

For clarity and simplicity, the environment 100 is illustrated in a schematic form where only one client 104 is shown when actually several hundred or more clients may be utilized. It will be appreciated that "server" refers to the program that is managing the associated resources and that several "servers" may be incorporated within one physical computer or alternatively multiple computers may be coupled to execute a single "server" program in order to accomplish the desired performance. The clients 104 may be stand alone desktop personal computers, part of a network or like arrangement. The following description will refer to servers in combination with the clients 104 as is standard terminology within the art. It is also envisioned that the distributed computing network 102 has routers, firewalls, subnets, buffers, buses, load balancers, secure lan switches, Web servers and like devices as would be appreciated by one of ordinary skill in the pertinent art.

Figure 1A:
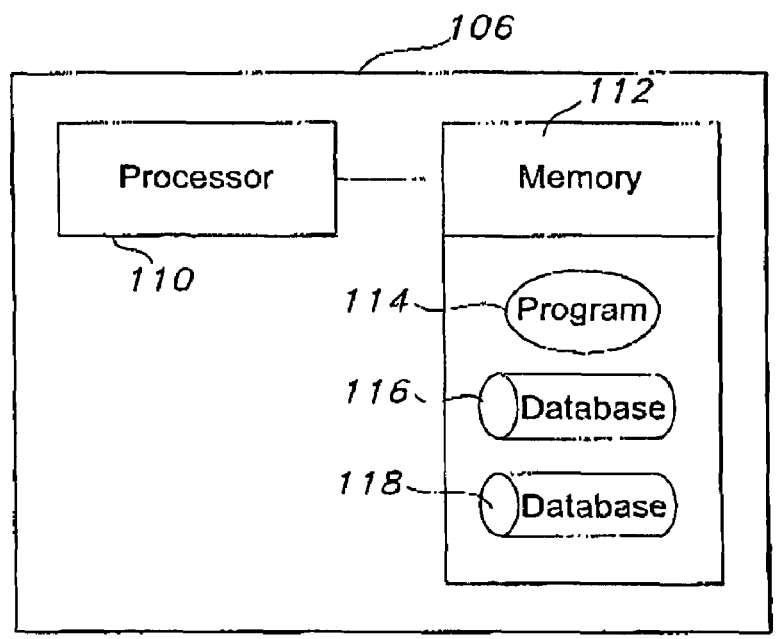
FIG. 1A is a schematic of a server for storing data in accordance with the embodiment of FIG. 1.

Referring now to FIG. 1A, the database servers 106 warehouse information in relational and other types of databases for access by the clients 104. The database server 106 shown in FIG. 1A is exemplary and includes a processor 110 in communication with memory 112. The memory 112 stores a program 114 that is the instruction set to allow the database servers 106 to perform the functions in accordance with the subject disclosure. The memory 112 also stores a plurality of databases 116, 118, relational and otherwise as required. For example, databases 116, 118 include information relating to permissions for users associated with clients, compliance information, credit information, data relating to vendors, audit trails, rate information, financing information, user data related to clients of the user, attributes of investment vehicles such as bonds, settlement data for transactions, tax return information and the like as would be necessary to run the envisioned asset management and risk management services. It is envisioned that each database server 106 would have similar hardware configurations and, for simplicity, are not further described herein.

Figure 1B:
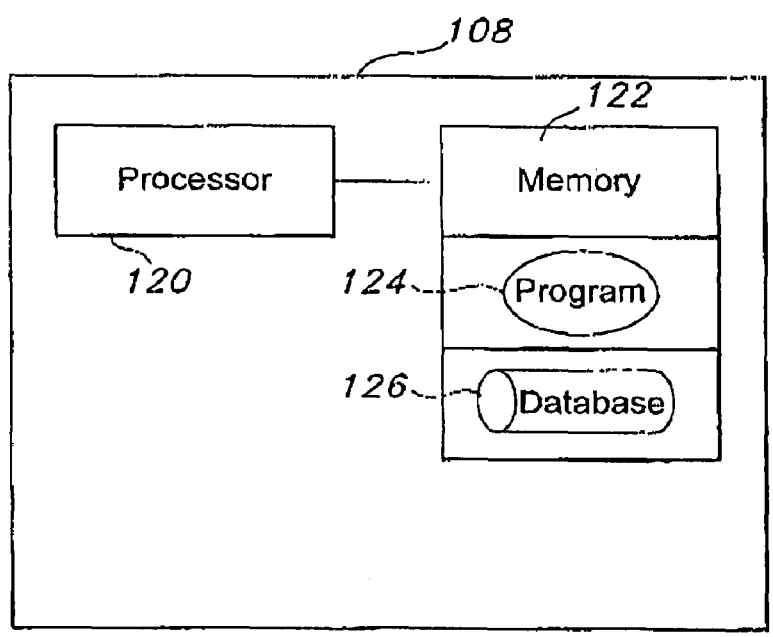
FIG. 1B is a schematic of a server for executing a program for processing data in accordance with the embodiment of FIG. 1.

Referring now to FIG. 1B, the source control server 108 interacts with the clients 104 and performs the execution necessary to implement the subject invention. The source control server 108 includes a processor 120 in communication with memory 122. The memory 122 is configured to store a program 124 that defines the instruction set which allows the source control server 108 to perform the functions in accordance with the subject disclosure. The memory 122 also stores a plurality of databases 126, relational and otherwise as required.

Figure 2:
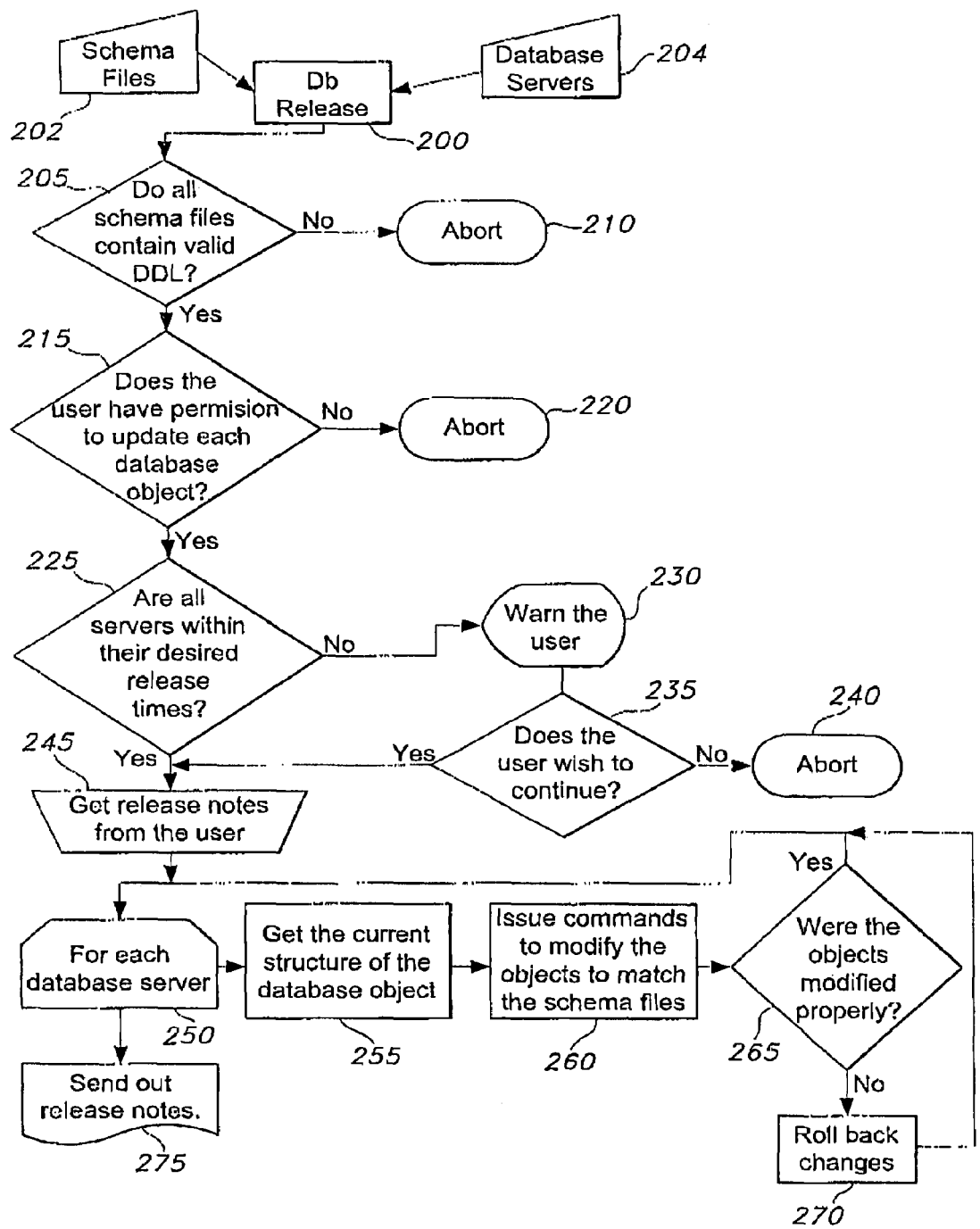
FIG. 2 is a flow diagram illustrating the method steps associated with updating a plurality of database servers in accordance with the subject invention.

Referring to FIG. 2, a process flow for the source control system server 108 is shown. Throughout the process flow, the source control system server 108 applies executes instructions and applies rules in accordance with the subject invention. At step 200, the user runs the program 124 on source control system server 108 by accessing a client 104. The user specifies database schema files 202 to be released and a list 204 of database servers 106 where the necessary changes are to occur.

At step 205, the source control system parses the schema files and verifies whether the schema files contain valid DDL commands. The source control system server 108 also verifies and enforces the rule that the DDL is not modifying any objects other than the objects that the file names specify. For example, if a database object is being created, the file name of the object being created (or altered, etc.) must have the same name as the object. For example, a table named "first" would need to be in a file named first.tbl. It is envisioned that a plurality of file types are supported. These file types include, without limitation, tables (.tbl), views (.view), indexes (.idx), permissions (.perms), stored procedures (.proc), triggers (.tr), defaults (.def), rules (.rule), and others as would be appreciated by those of ordinary skill in the pertinent art.

The source control system server 108 also enforces the rule that each file only contains the object being created or modified. If additional items are included, certain limitations may prevent execution. For example, two tables cannot be created from one .tbl file and permissions cannot be assigned from the same .tbl file as the table is created. In such instances, the permissions need to be placed in a separate .perms file.

Certain items are not required to be in files because the source control system server 108 automatically generates the items. For instance, drop statements should not be at the top of any files nor should a use database_name directive be present in the file. If the files do not contain valid DDL commands, the source control system server 108 proceeds to step 210 where the process is aborted. If no conditions are violated, the source control system server 108 proceeds to step 215.

At step 215, the source control system verifies that the user has permission to modify the database objects. In a preferred embodiment, the permissions are controlled by a permissions file that specifies which users have permissions to release each database object and the servers that those object will be released to. The process proceeds to step 220 and is aborted if the user does not have the proper release permissions. If the permission of the user in in order, the process continues to step 225.

Referring to FIG. 3, an examplary table 300 shows the contents of a file named bfmdb/permissions.tbl for defining the permission granted to users or a group of users as the case may be. The table or file 300 contains the DDL statements to create the permissions table in the bfmdb database. The text that is contained between the /*! . . . */is used as comments that are added to the automatically generated documentation. The table names in the comments that are preceded by the tag TABLE: are automatically converted by the source control system server 108 into hyperlinks to the documentation pages for those tables.

The source control system server 108 initially creates database objects in an empty database or modifies the structure of existing database objects to match the desired structure in the file. The location of files is important and a suitable naming convention should be selected. In a preferred embodiment, the following naming convention is used for database schema files:

{DatabaseName}/{ObjectName}.{ObjectType}

All schema files for a particular database are grouped together in a directory with the same name as the database. The ObjectName must match the name of the object that is created by the DDL in the file. The source control system server 108 will not allow a user to release a file called MyTable.tbl if that file contains DDL to create any objects other than the table MyTable. The ObjectType extension will be one of the following strings: tbl (Table); view (View); idx (Indexes); proc (Stored Procedure); tr (Trigger); rule (Rule); def (Default); or perms (Permissions). The schema files are managed by a version control system to track their change history.

Identification files are used by the source control system server 108 to identify the database servers 106 that are being managed and the entire set of database objects to be managed. The identification files contain release permission information for each database object. The permissions specify the users who are able to release changes to each database object, the database servers 106 to which those changes will be released and the best times of the day when changes can be made to each database server 106. Preferably, access to the identification files is limited to the administrators of the release system.

Referring again to FIG. 2, at step 225, the source control system server 108 checks that all the database servers 106 are within their desired release times. All files should be released to production by having the source control system server 108 determine which database receives the release by the file system layout. If any of the database servers 106 are not within the corresponding release time, a warning is generated at step 230 and provided to the user at step 235. The user can abort the process at step 240 or continue the process to step 245.

At step 245, source control system server 108 requires the user to enter release notes that explain the data being changed by the release and the reason for the change (for example, see FIG. 7). The release notes are automatically mailed to a predefined set of email addresses after the release is successfully completed at step 275. The distribution for the release notes is selected by the user and can include all users or a predefined group of users such as the members of the information technology department of a corporation or other entity.

At steps 250-270, the source control system begins to parse the DDL in a schema file to determine the structure that a database object should have on a server by server basis. At step 255, the source control system determines the current structure of the database objects of the particular database server. The proposed structure is then compared to the structure of the database object on each database server. Destinations are an optional arguement. If no destination is specified, then the default destinations are used for the given file, or in the case of a module, each file within the module is released to the default destinations. In another embodiment, a comma-delimited list of destinations is specified by a user. The destinations are read from a locations file and accessed from a token. When specifying hosts, specific hosts can be excluded from the set and the order in which destinations and exclusions are listed is not relevant.

At step 260, the source control system server 108 automatically issues the appropriate commands to modify the structure of the database object on the respective database server 106 so the structure matches the structure that is represented in the schema file. The source control system server 108 also automatically generates documentation for all database objects. The goal is to have the database schema match the files in CVS. As a result, alter table statements no longer need to be written. Rather, the .tbl file is modified such that the .tbl file reflects the desired format and the source control system server 108 creates the alter table statements automatically for the user. Similarly, if an index is to be added to a table that already has indexes, the user adds the additional index to the .idx file and the source control system server 108 only issues the commands for the indexes that do not already exist.

With continuing refferrence to FIG. 2, at step 265, the source control system verifies that the database objects were modified properly. If any errors occur during the release of a structure change, the original structure of the database object is restored on the server where the error occurred at step 270. If no errors occurred, the process proceeds from step 265 back to step 250 until the parsing has been completed for each server. Upon completion of parsing for each server, the process passes to step 275. At step 275, the release notes are mailed out. The release notes preferably identify all servers where the changes to the database structure were successfully released and any servers where the release failed. Any error messages from a failed update on a server will be contained in a failure email.

When releasing a table, procedure or view, if there is a file with the same name as the object but with the .perms extension, then such file is run after running the create statement. This situation would only occur when the object is being created so that in the case of tables that have alter table statements issued, the source control system server 108 does not automatically run permissions. In addition, location specific permission files can be specified.

It is also envisioned that the user can release files in different modes to suit specific objectives. For example, the following command line can select between different modes:

databaserelease   [options]   databasename/objectname[: destinations]

Illustrative options would be as follows.

Test Mode

Test mode ("-t/") allows release of objects from anywhere on the file system. By default, the release is to hosts specified as "test" in a .locations file. No permissions entry is necessary and no automatic permissions are run. As a result, users or developers can test the new SQL on a development server(s) (not shown) without needing to request a permissions entry. However, since permissions are not checked, module releases are not possible in test mode. In addition, only the user releasing the files is emailed and no postings are made to the news servers 107 (see FIG. 1) and no release notes are requested.

For example, if a new table named bar is designed that the user would like to create in the eaconn database on several production database servers 106, before releasing the object to production, the user can test the object. The source control system server 108 determines which database(s) the user wants to release to through the file system layout. Accordingly, an exemplary file created to accomplish this would be as follows:

/ul/anyuser/dev/sql/eaconn/bar.tbl

The important aspect of this exemplary file is that the bar.tbl is directly in the eaconn directory. The remainder of the path is not relevant and, therefore, can vary. Some standards, however, do apply. If the file specified begins with a "/", then the source control system server 108 treats the file as a fully qualified path, otherwise the source control system server 108 looks for the file in a default path such as /ul/build/dev/sql/. When using test mode, the default location for all files are the set of hosts that are specified as "test" in the "rw" field of the file with a locations extension. The user may specify a subset of the test servers in the optional destinations at the command line.

Drop Mode

Drop mode ("-d/") will drop a given object by issuing a drop command for the object called at the command line. Drop mode and drop modules should not be used together. In addition, although a permissions entry is necessary, the file does not necessarily have to exist in the file system. If drop mode is being used to permanently drop an object, then all files for that object should also be removed from CVS.

No Perms Mode

No perms mode ("-n/") will not run any automatic permissions unless the user explicitly runs a permission in a single file release or a module release. In other words, if a permissions file is explicitly released, either as a single file or as part of a module, then the permissions file will still be released. Thus, the no perms mode is only relevant when releasing an object for the first time or when running in recreate mode described below. There is no need to run permissions otherwise due to an alter statement being issued to preserve the current permissions.

Help Mode

Help mode ("-h/") displays comprehensive command line help.

What if Mode

What if mode ("-w/") displays the exact SQL that would be issued to each of the specified servers without actually running any commands. This mode would be used to see exactly what SQL commands would need to be executed on each server to make the database schema on that server the same as the schema file.

Recreate Mode

Recreate mode ("-r/") directly runs the contents of a given file instead of running the automatically created alter statements when applicable. In recreate mode, permissions files are automatically run when applicable.

Automatic Permissions Release Logic

For files of the type procedure, table and view, the source control system server 108 automatically releases permissions except when in drop mode, test mode, no permissions mode or when the table already exists and an alter table statement is issued. As noted above, the permissions files can be specified in a .perms file. Permisions files begin with the same name as the respective object to which the permissions file applies The source control system supports different permissions for different database servers in one of two preferred methods. In a first method, multiple permission files are permitted for a single object. Each multiple permission file has a name such as <objname>-<svrgroup>.perms where <objname> where the name of the object that the permission file specifies permissions for, and <svrgroup> designate a group of servers to which the permissions in the multiple permission file applies. If the permissions file has an entry in the default permissions file, then the permissions file will only be released to the specified locations. The second method to specify different permissions for different servers can be done within a single permissions file. In a permission file, comment lines may appear with the form: --!DBSERVER:<svrgroup>. When the comments are encountered, the source control system recognizes that the permissions that follow the comment line should only be applied to database servers in <svrgroup>. Multiple lines of this type may appear in a permissions file to designate permissions that should only be applied on certain servers.

In the source control system, database servers may be designated as "read-only" servers. In the default permissions file, database objects may marked so that the object does not receive any update permissions on read-only servers. When the permissions are released for the objects on a read-only server, any update permissions that would normally be granted are automatically removed for that server. Accordingly, for tables and views, permissions of insert, update and delete are not granted on read-only servers. For stored procedures that update the database, execute permission is not granted on read-only servers.

Automatic Recovery Logic

For all files of type procedure, table, view and trigger, the object will be renamed to the object name and appended to _DBRELBAK. The release proceeds and if an error occurs in releasing the object, the permissions or any other object on the given destination, then the backup is renamed back to the original object name. Because the backup object name is easily determined, the backup object name can be referenced by scripts explicitly for copying data out of an old table to create a new table and the like.

Module Logic

Modules allow many objects to be released at once without having to run a release procedure multiple times. All elements in a module are defined as a normal release in the permissions file. The module syntax indicates a set of files to be released together. As a result, if no destinations are specified at the command line, then the source control system server 108 uses the default destinations and each file is released accordingly. If destinations are specified at the command line, then the module release occurs to those destinations so long as all of the destinations specified at the command line are a subset of each file's default destinations specified in the default permissions file.

The files are released one database server 106 at a time. If there is an error in any of the files or permissions, then no more files are released for that destination and a rollback begins by returning the backup files to the original name. Yet to be released files are untouched. Errors on any given database server 106 have no effect on release to other database servers 106. Thus, even if there is a SQL statement in a file that fails on the first destination, the release is still attempted on all of the other database servers 106. In addition, users can specify multiple files at the command line by comma-delimiting the commands such as the following command:
databaserelease fu/razzle.tbl,my/dazzle.tbl:FRE_ALL As a result, the user can advantageouly release a plurality of instructions with a single command line.

Release Logging in Databaserelease_locations

Each time an object is successfully released to a given destination, the change is recorded in a table. The object name, database name, file type as an extension, tag for the file released as determined by the source control system server 108, the previous tag if a row for the object already existed, the user who executed the command and the time of the release are all recorded. In an unsuccessful release, the values are not updated at all. As a result, the source control system server 108 can track the most current release of any given object on all of the databases and determine the corresponding file in CVS for the given object. Thus, a user can view this table to see the history of where an object came from.

Referring to FIGS. 3-6, an example of the documentation generated during the process of FIG. 2 is shown. In FIG. 3, the table 300 of FIG. 3 defines the permissions for a group of users at step 215 of FIG. 2. Based upon the table 300, the source control system server 108 initially creates database objects in a new database or modifies the structure of existing database objects to match the desired structure in the file as required.

Figure 4A:
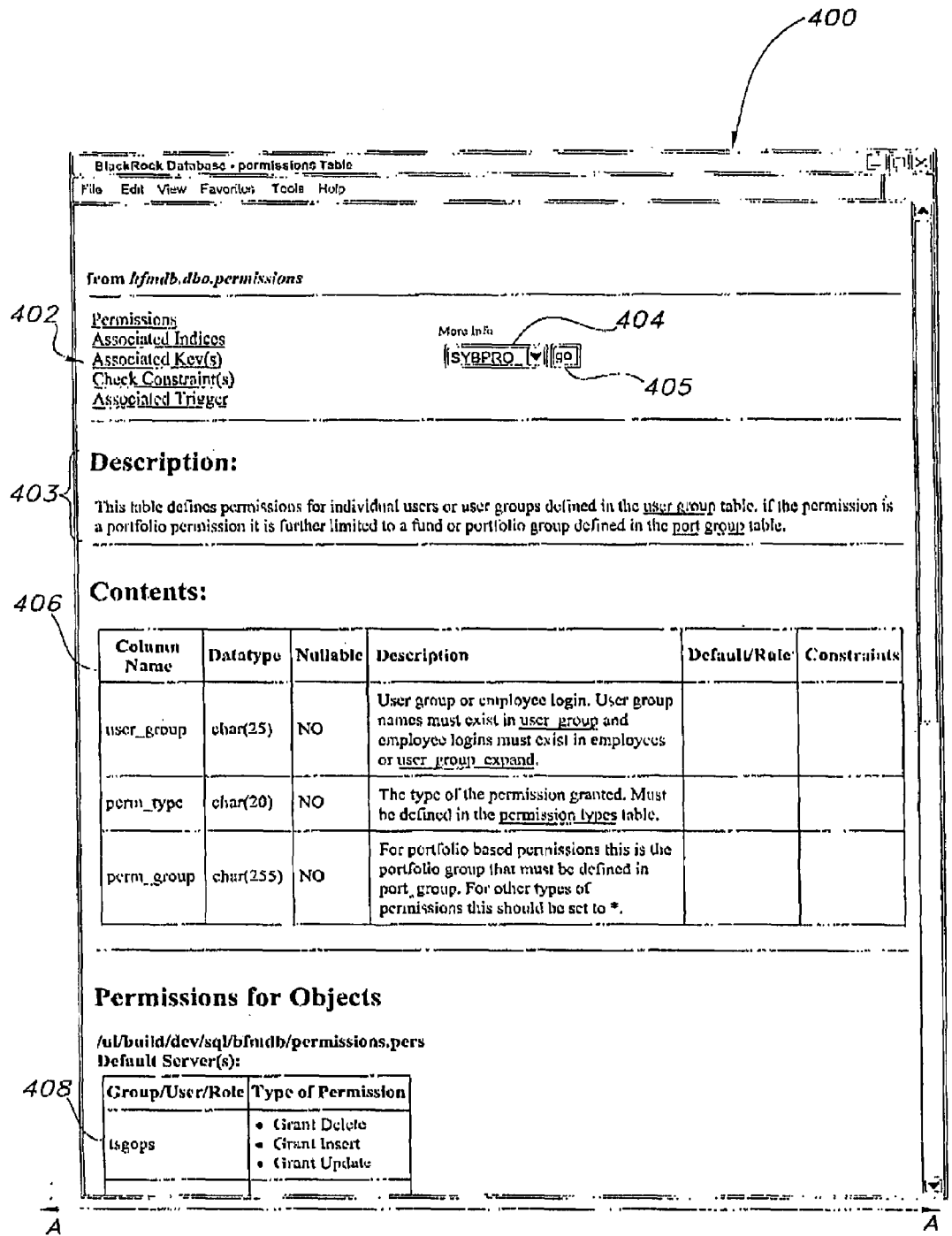

Referring now to FIGS. 4A and 4B, still at step 215 of FIG. 2, the documentation page 400 that is generated for the permissions table 300 from the database schema files is shown. The documentation page 400 is generated periodically such as nightly, weekly, or monthly. The documentation page 400 contains a short description 403 of the database object. The description 403 is extracted from comments in the database schema file 303.A contents section 406 provides information related to the columns that are contained in the database table. For each column, the contents section 406 contains the column name, type column type, an indication of whether or not the column may contain NULL values, and a short description of the column. If there are any defaults, rules or constraints on the column then links to that information are provided. A plurality of links 402 allow access to additional information. The additional information includes permissions, associated indices, associated keys, constraints and triggers. The permissions link is associated with the permissions for objects section 408. The indicies link of section 403 is associated with indices link section 410. The indices link section 410 shows the indices on the table that control the way in which the data is organized. The associated keys link of section 403 is assocated defined keys section 416. Keys are used to define the fields that are needed to uniquely identify an entry in the table. The constraints link of section 403 is associated with the reference constraint section 412 and the check constraint section 414. Constraints allow a user to define unacceptable criteria for the data stored in a column. For example, a constraint may require that a column should only contain "Y" or "N" or that the column may only contain values that are defined in a referenced table. The trigger link of section 403 is associated with associated trigger section 418. Associated trigger section 418 contains links to documentation on any triggers that exist for the table. A trigger on a table is used to perform some operations whenever the table is updated.

The documentation page 400 also includes a pull-down menu section 404 to obtain more information on the database object. A pull down menu is available at section 404 for selecting between available database servers 106. Preferably, from documentation page 400, a user can prompt the source control system server 108 to compare the structure of the table on the selected server with the structure in the database schema file by selecting the "go" button 405 as is well known to those of ordinary skill in the pertinent art. Preferably, when additional information is requested, the additional information is displayed on another page (for example, see FIGS. 5A, 5B and 5C).

Figure 5A:
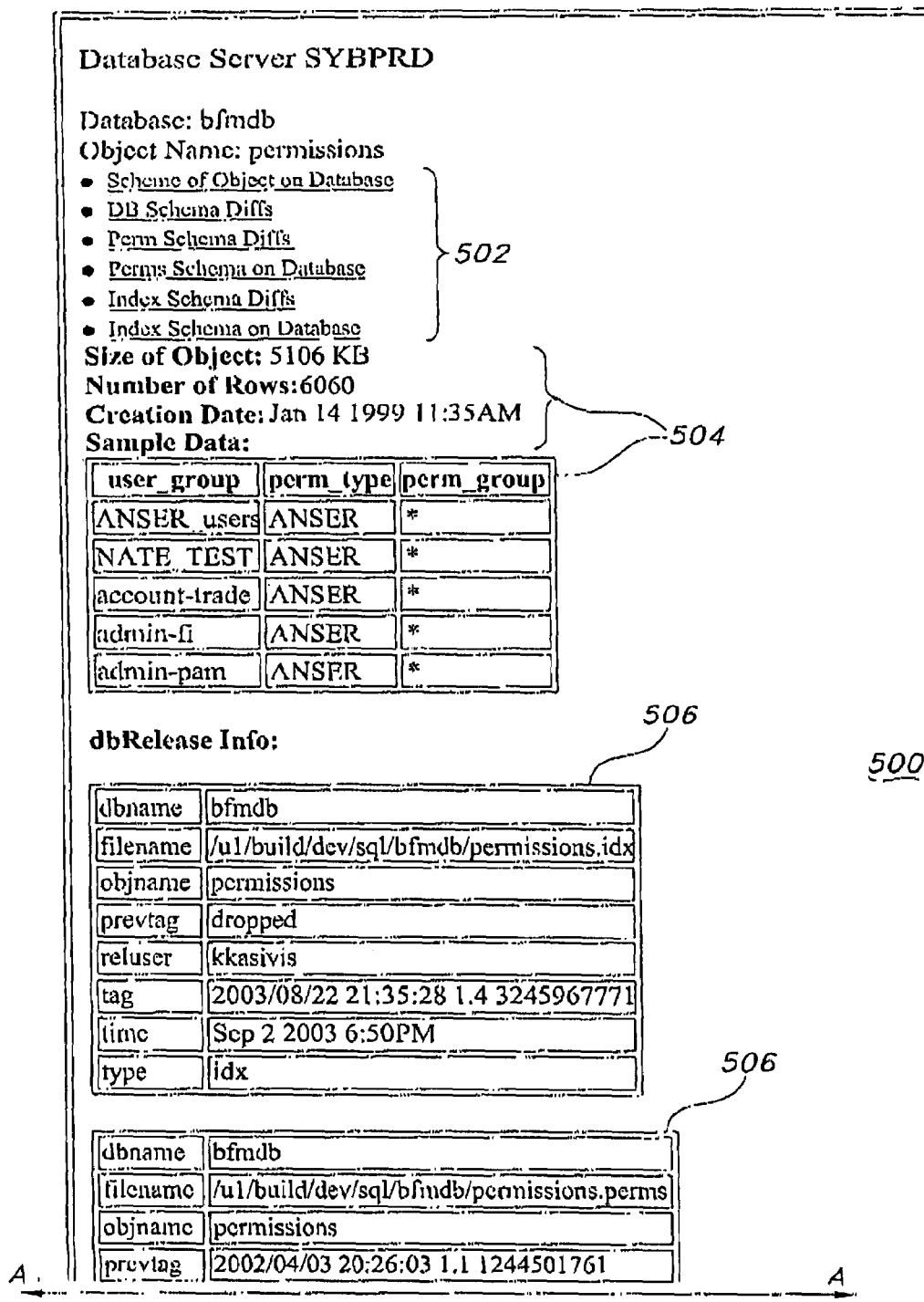
Figure 5B:
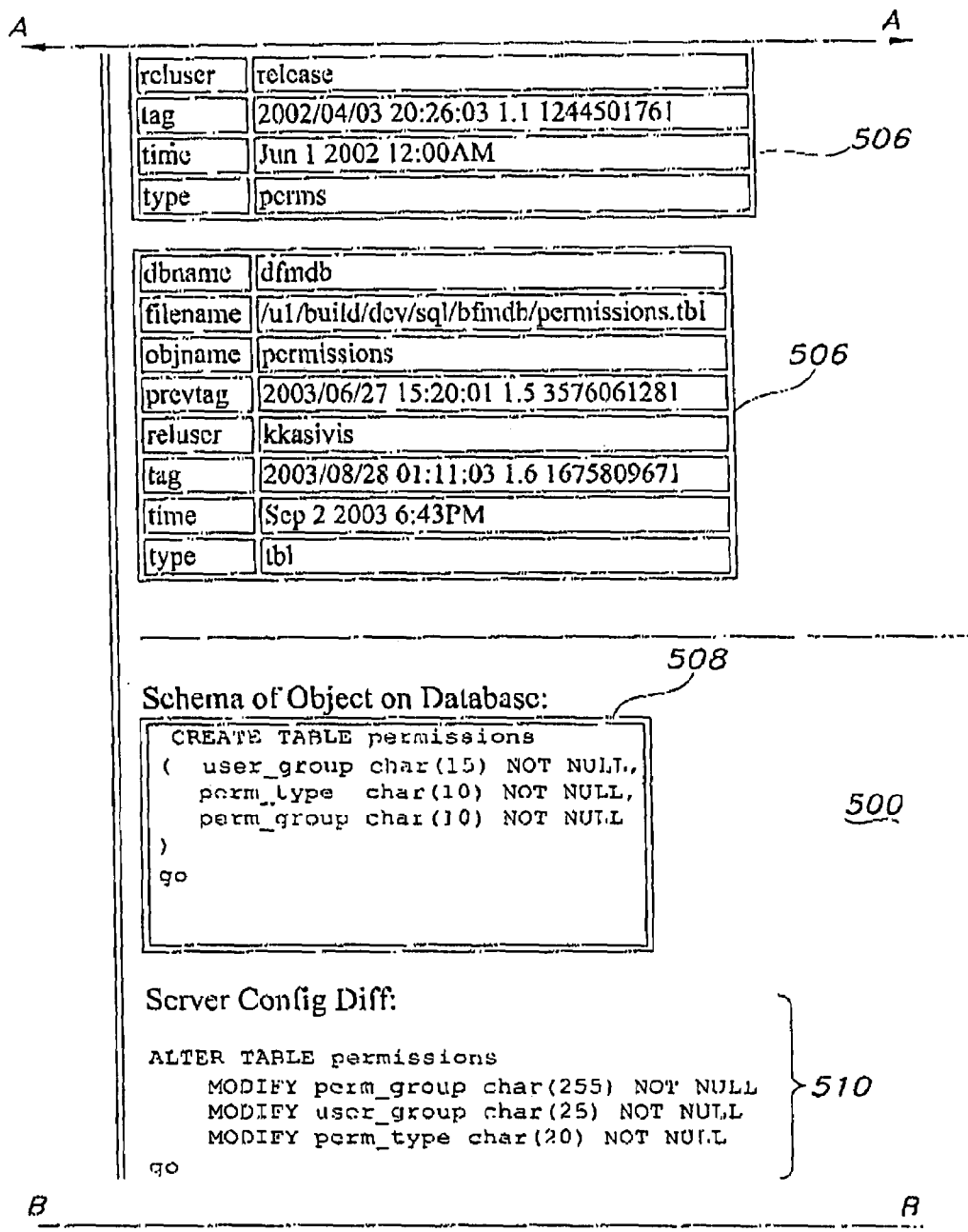

Referring now to FIGS. 5A, 5B and 5C, an exemplary documentation page 500 that is generated for the permissions table 300 from a selected database server is shown. The documentation page 500 is generated and displayed from page 400 when a user selects a database server and presses the "go" button. A plurality of links 502 allow access to information on the permissions table 300. The information includes the schema for the table 300, permissions on the table 300 and indexes on the table 300. The schemas for the table 300 are extracted from the database server SYBPRD. There is also information that shows differences between the extracted schema information and the schema that is defined by the database schema files.

An area 504 provides some basic information about the permissions table 300 from the database server. The basic information includes the size of the table, the number of rows, the creation date and sample data. The sample data shows the first five rows of data selected from the table 300.

A section 506 shows release information for the permissions table 300. The release information contains release data for the table schema, the table permissions and indexes on the table. For each release, the release information contains the name of the file that was released, the tag for the file that was released and for the previous release, the user who made the release and the time that the release was made and the like.

An area 508 shows an example of a desired structure for the permissions table 300. The area 510 shows the corresponding commands that would need to be run on the selected server to make the schema on that server the same as database schema file. In reference to FIG. 2, the structure of the database objects is accessed at step 255 and the system determines the appropriate commands to modifiy the database object at step 260. Still referring to FIGS. 5A, 5B and 5C, the types of the three fields are modified. The ALTER TABLE command will change the types of the three fields to be modified. The release command is used to make these changes on the database server.

An area 510 shows an example of database permissions on the selected database server for the permissions table 300. The area 512 shows the commands that would have to be run to modify these permissions so that they match the database schema permissions file. An area 514 shows the indexes that exist on the selected database server for the permissions table 300. An area 516 shows the command that would modify those indexes to match the database schema index file. In this example, the indexes in the index file are the same as the indexes on the database server so that a message is displayed in section 516 to indicate this.

Referring now to FIG. 6, an exemplary page output by the release according to FIG. 5 is referred to generally by the reference numeral 600. Page 600 is generated at step 265 of FIG. 2. In the example of page 600, the database schema file matched the table structure on a server called SYBDEV. Consequently, no changes were made. In contrast, on a server called SYBPRD, the ALTER TABLE command accomplished the desired changes. In a preferred embodiment, the automated documentation is distributed via email on the Internet for all of the database objects. The automated documentation is generated on a periodic basis, such as nightly, from the database schema files. The database schema files are maintained in the source control system.

Referring now to FIG. 7, there is illustrated another exemplary page of release notes designated generally by the reference numeral 700. The page 700 is generated automatically in conjunction with page 600 of FIG. 6. In reference to FIG. 2, page 700 is generated at step 275. Page 700 of release notes has no changes because the database schema file matched the table structure on the server SYBDEV. The structure on SYBPRD had to be modified and this was accomplished by issuing an ALTER TABLE command.

While the invention has been described with respect to preferred embodiments, those skilled in the art will readily appreciate that various changes and/or modifications can be made to the invention without departing from the spirit or scope of the invention as defined by the appended claims.

What is claimed is:

1. A program product for use in a computer system that executes program steps recorded in a computer-readable medium to perform a method for updating database objects to manage version control of a database configuration in a plurality of database servers in a distributed computing network, the program product comprising:

a recordable media for storing a program; and the program of computer-readable instructions executable by the computer system to perform steps including:

(a) receiving user specified database schema files for release to a list of corresponding database servers where modifications are to occur, wherein each schema file includes proposed database object structures;

(b) verifying that the schema files contain valid Data Definition Language commands;

(c) verifying that the user has proper permissions to modify the database object structures, wherein the proper permissions are controlled by a permissions file that specifies which users have permissions to release each database object structures and the database servers that the respective database object structures are released to;

(d) comparing existing database object structures to the proposed database object structures to determine if the existing database object structures need to be modified;

(e) if the exising database object structures need to be modified, then, i) automatically generating and executing the appropriate commands based on the comparison to modify the existing database object structures;

ii) checking that the database servers being modified are within a respective release time;

iii) automatically generating identification files to identify the database servers that are being managed and an entire set of database object structures being managed, wherein the identification files include release permission information for each database object that specify the users who are able to release changes to each database object, the database servers to which those changes are released and specified times when changes are made to each database server while access to the identification files is limited to administrators;

iv) automatically parsing the valid Data Definition Language commands in a schema file to determine the database object structure that a respective database object should have on a database server by database server basis;

v) automatically issuing commands to modify the database object structure of the respective database object on the respective database server so the database object structure matches the database object structure that is represented in the respective schema file; and vi) verifying that the database objects were modified properly such that if any errors occur during a structure change, an original structure of the database object is restored on the respective database server by renaming the original database object by appending a respective object name to an identifier as a backup and renaming the backup back to the original respective object name when an error occurs related to such database object;

(f) automatically creating release notes, based on the identification files, wherein the release notes are generated on a periodic basis and include documentation related to modifications of the database object structures;

(g) automatically releasing permissions files; and (h) automatically sending the release notes to a plurality of predefined addresses so that users associated with the predefined addresses view a history of where the database objects came from in order to verify reliable storage and, as necessary, retrieval of the database object structures.

2. A program product as recited in claim 1, wherein the program further performs the step of checking that each database server that has a structure modified has the modification occur during a prescribed release time.

3. A program product as recited in claim 1, wherein the program further performs the step of receiving a selection of database servers as locations where modifications are to occur.

4. A program product as recited in claim 1, wherein the program further performs the step of verifying each modification was performed successfully.

5. A program product as recited in claim 1, wherein the program further performs the steps of receiving a plurality of schema files and bundling the plurality of schema files into a module for simultaneous execution.

6. A program product as recited in claim 1, wherein the program further performs the step of verifying that the schema files meet predefined standards.

7. A program product as recited in claim 1, wherein the program further performs the step of parsing the schema files for sequential processing.

8. A program product as recited in claim 1, wherein the program further performs the step of maintaining a history of modifications to the database object structures.

9. A program product as recited in claim 1, wherein the step of verifying that the schema files contain valid DDL commands includes enforcing a rule that the DDL commands are not modifying any database object structures other than the database object structures that the schema files specify.

10. A program product as recited in claim 1, wherein the program further performs the step of accessing identification files for identifying the database servers where modifications are occurring, wherein the identification files contain release permission information for each database object structure that is to be modified.

11. A program product as recited in claim 1, wherein the instructions further perform the step of selectively functioning in a what-if-mode that displays generated SQL commands for a user prior to running any such generated SQL commands.

12. A program product as recited in claim 1, wherein multiple permission files are related to a single database object and the permission files designate a group of servers to which permissions in the multiple permission files apply.

13. A program product as recited in claim 1, wherein a single permissions file specifies different permissions for different database servers.

14. A method of managing a structure of database objects in a plurality of database servers in a distributed computing network such that a configuration of the structure is properly updated so that data therein is reliable, the method comprising the steps of:

(a) receiving user specified database schema files for release to a list of corresponding database servers where modifications are to occur, wherein each schema file includes proposed database object structures;

(b) verifying that the schema files contain valid Data Definition Language commands;

(c) verifying that the user has proper permissions to modify the database object structures, wherein the proper permissions are controlled by a permissions file that specifies which users have permissions to release each database object structures and the database servers that the respective database object structures are released to;

(d) comparing existing database object structures to the proposed database object structures to determine if the existing database object structures need to be modified;

(e) if the exising database object structures need to be modified, then, i) automatically generating and executing the appropriate commands based on the comparison to modify the existing database object structures;

ii) checking that the database servers being modified are within a respective release time;

iii) automatically generating identification files to identify the database servers that are being managed and an entire set of database object structures being managed, wherein the identification files include release permission information for each database object that specify the users who are able to release changes to each database object, the database servers to which those changes are released and specified times when changes are made to each database server while access to the identification files is limited to administrators;

iv) automatically parsing the valid Data Definition Language commands in a schema file to determine the database object structure that a respective database object should have on a database server by database server basis;

v) automatically issuing commands to modify the database object structure of the respective database object on the respective database server so the database object structure matches the database object structure that is represented in the respective schema file; and vi) verifying that the database objects were modified properly such that if any errors occur during a structure change, an original structure of the database object is restored on the respective database server by renaming the original database object by appending a respective object name to an identifier as a backup and renaming the backup back to the original respective object name when an error occurs related to such database object;

(f) automatically creating release notes, based on the identification files, wherein the release notes are generated on a periodic basis and include documentation related to modifications of the database object structures;
(g) automatically releasing permissions files; and
(h) automatically sending the release notes to a plurality of predefined addresses so that users associated with the predefined addresses view a history of where the database objects came from in order to verify reliable storage and, as necessary, retrieval of the database object structures.

15. A method according to claim 14, further comprising the step of checking that each database server that has a structure modified has the modification occur during a prescribed release time.

16. A method according to claim 14, further comprising the step of receiving a selection of database servers as locations where modifications are to occur.

17. A method according to claim 14, further comprising the step of verifying each modification was performed successfully.

18. A method according to claim 14, further comprising the steps of receiving a plurality of schema files and bundling the plurality of schema files into a module for simultaneous execution.

19. A method according to claim 14, further comprising the step of verifying that the schema files meet predefined standards.

20. A method according to claim 14, further comprising the step of parsing the schema files for subsequent processing.

21. A computer network for managing database comprising:
   a plurality of computers, wherein at least one of the computers has a CPU operatively connected to memory for storing databases; and
   a source control system on at least one of the computers for managing a structure of database objects in a plurality of database servers in a distributed computing network wherein the source control system is for:
   (a) receiving user specified database schema files for release to a list of corresponding database servers where modifications are to occur, wherein each schema file includes proposed database object structures;
   (b) verifying that the schema files contain valid Data Definition Language commands;
   (c) verifying that the user has proper permissions to modify the database object structures, wherein the proper permissions are controlled by a permissions file that specifies which users have permissions to release each database object structures and the database servers that the respective database object structures are released to;
   (d) comparing existing database object structures to the proposed database object structures to determine if the existing database object structures need to be modified;
   (e) if the exising database object structures need to be modified, then,
      i) automatically generating and executing the appropriate commands based on the comparison to modify the existing database object structures;
      ii) checking that the database servers being modified are within a respective release time;
      iii) automatically generating identification files to identify the database servers that are being managed and an entire set of database object structures being managed, wherein the identification files include release permission information for each database object that specify the users who are able to release changes to each database object, the database servers to which those changes are released and specified times when changes are made to each database server while access to the identification files is limited to administrators;
      iv) automatically parsing the valid Data Definition Language commands in a schema file to determine the database object structure that a respective database object should have on a database server by database server basis;
      v) automatically issuing commands to modify the database object structure of the respective database object on the respective database server so the database object structure matches the database object structure that is represented in the respective schema file; and
      vi) verifying that the database objects were modified properly such that if any errors occur during a structure change, an original structure of the database object is restored on the respective database server by renaming the original database object by appending a respective object name to an identifier as a backup and renaming the backup back to the original respective object name when an error occurs related to such database object;
   (f) automatically creating release notes, based on the identification files, wherein the release notes are generated on a periodic basis and include documentation related to modifications of the database object structures;
   (g) automatically releasing permissions files; and
   (h) automatically sending the release notes to at least one predefined address so that a user associated with the predefined address views a history of where the database objects came from in order to verify reliable storage and, as necessary, retrieval of the database object structures.

22. A computer network as recited in claim 21, wherein the computer network further performs the step of checking that each database server that has a structure modified has the modification occur during a prescribed release time.

23. A computer network as recited in claim 21, wherein the computer network further performs the step of receiving a selection of database servers as locations where modifications are to occur.

24. A computer network as recited in claim 21, wherein the computer network further performs the step of verifying each modification was performed successfully.

25. A computer network as recited in claim 21, wherein the computer network further performs the steps of receiving a plurality of schema files and bundling the plurality of schema files into a module for simultaneous execution.

26. A computer network as recited in claim 21, wherein the computer network further performs the step of verifying that the schema files meet predefined standards.

27. A computer network as recited in claim 21, wherein the schema files for a particular database are grouped together in a directory having a name.

28. A computer network as recited in claim 27, wherein the name is used for a name of the directory.

* * * * *